United States Patent
Brown et al.

(10) Patent No.: US 8,384,620 B2
(45) Date of Patent: Feb. 26, 2013

(54) LASER PROJECTION WHITE BALANCE TRACKING

(75) Inventors: Margaret K. Brown, Seattle, WA (US); Mark Champion, Kenmore, WA (US); Michael Lee Schaaf, Bainbridge Island, WA (US); Heng Huang, Sammamish, WA (US)

(73) Assignee: Microvision, Inc., Redmond, WA (US)

( * ) Notice: Subject to any disclaimer, the term of this patent is extended or adjusted under 35 U.S.C. 154(b) by 198 days.

(21) Appl. No.: 13/101,002

(22) Filed: May 4, 2011

(65) Prior Publication Data

US 2011/0205498 A1  Aug. 25, 2011

Related U.S. Application Data

(63) Continuation of application No. 11/962,561, filed on Dec. 21, 2007, now abandoned.

(51) Int. Cl.
*G09G 3/16* (2006.01)

(52) U.S. Cl. .......... 345/31; 345/77; 345/81; 345/84; 353/69

(58) Field of Classification Search .......... 345/205–207, 345/690, 697, 214–215, 36, 39, 47–48, 73, 345/76–78, 82–84, 108–110; 353/7–85
See application file for complete search history.

(56) References Cited

U.S. PATENT DOCUMENTS

| 5,867,152 | A  |   | 2/1999  | Sextro |
|-----------|----|---|---------|--------|
| 5,978,148 | A  | * | 11/1999 | Oono et al. .................... 359/668 |
| 5,991,102 | A  | * | 11/1999 | Oono et al. .................... 359/820 |
| 2001/0048406 | A1 |  | 12/2001 | Masumoto |
| 2004/0227456 | A1 |  | 11/2004 | Matsui |
| 2006/0007249 | A1 | * | 1/2006 | Reddy et al. ................... 345/690 |
| 2006/0204125 | A1 | * | 9/2006 | Kempf et al. .................. 382/274 |
| 2008/0122819 | A1 | * | 5/2008 | Cho et al. ....................... 345/205 |
| 2008/0224966 | A1 | * | 9/2008 | Cok et al. ........................ 345/82 |
| 2009/0015521 | A1 | * | 1/2009 | Fish ................................. 345/76 |
| 2009/0079945 | A1 | * | 3/2009 | Klosowiak et al. ............. 353/69 |
| 2010/0045650 | A1 | * | 2/2010 | Fish et al. ...................... 345/211 |

FOREIGN PATENT DOCUMENTS

| EP | 1258956    | 11/2002 |
|----|------------|---------|
| JP | 07162597   | 6/1995  |
| JP | 07221369   | 8/1995  |
| JP | 2004296841 | 10/2004 |
| JP | 2005121688 | 5/2005  |

\* cited by examiner

*Primary Examiner* — Amare Mengistu
*Assistant Examiner* — Vinh Lam
(74) *Attorney, Agent, or Firm* — Kevin D. Wills

(57) ABSTRACT

The radiance of a laser diode is a function of laser diode drive current. The radiance is also a function of other factors, such as age and temperature. A laser projection device includes laser diodes to generate light in response to a commanded radiance, and also includes photodetectors to provide a measured radiance. The commanded radiance and measured radiance are compared, and drive currents for the laser diodes are adjusted to provide luminance and color balance tracking.

20 Claims, 9 Drawing Sheets

LASER PROJECTION WHITE BALANCE TRACKING

RELATED APPLICATIONS

Benefit is claimed under 35 U.S.C. 120 as a Continuation of U.S. application Ser. No. 11/962,561, entitled "Laser Projection White Balance Tracking" by Brown et al., filed Dec. 21, 2007, which is incorporated herein by reference in its entirety for all purposes.

FIELD

The present invention relates generally to laser projection systems, and more specifically to white balance tracking in laser projection systems.

BACKGROUND

Laser diodes emit light when current is passed through the diode. The output radiance of the laser diode varies as the drive current through the diode is varied. The output radiance of the laser diode may also vary due to other factors. For example, the output radiance of the laser diode may vary with age. Also for example, the output radiance of the laser diode may vary as the temperature of the diode varies. This can be problematic in part because the temperature of a laser diode may be affected by ambient temperature changes as well as the historical drive current which results in "self-heating" of the diode.

Color projectors that utilize laser diodes for light generation may suffer from variations in luminance and color balance as a result of aging, temperature changes, and other factors. The luminance of a displayed image may change as the radiance of each color laser diode changes. The color balance may also be affected if different color laser diodes have different responses to factors that affect radiance (e.g., aging, temperature, etc.).

DESCRIPTION OF EMBODIMENTS

Figure 1:
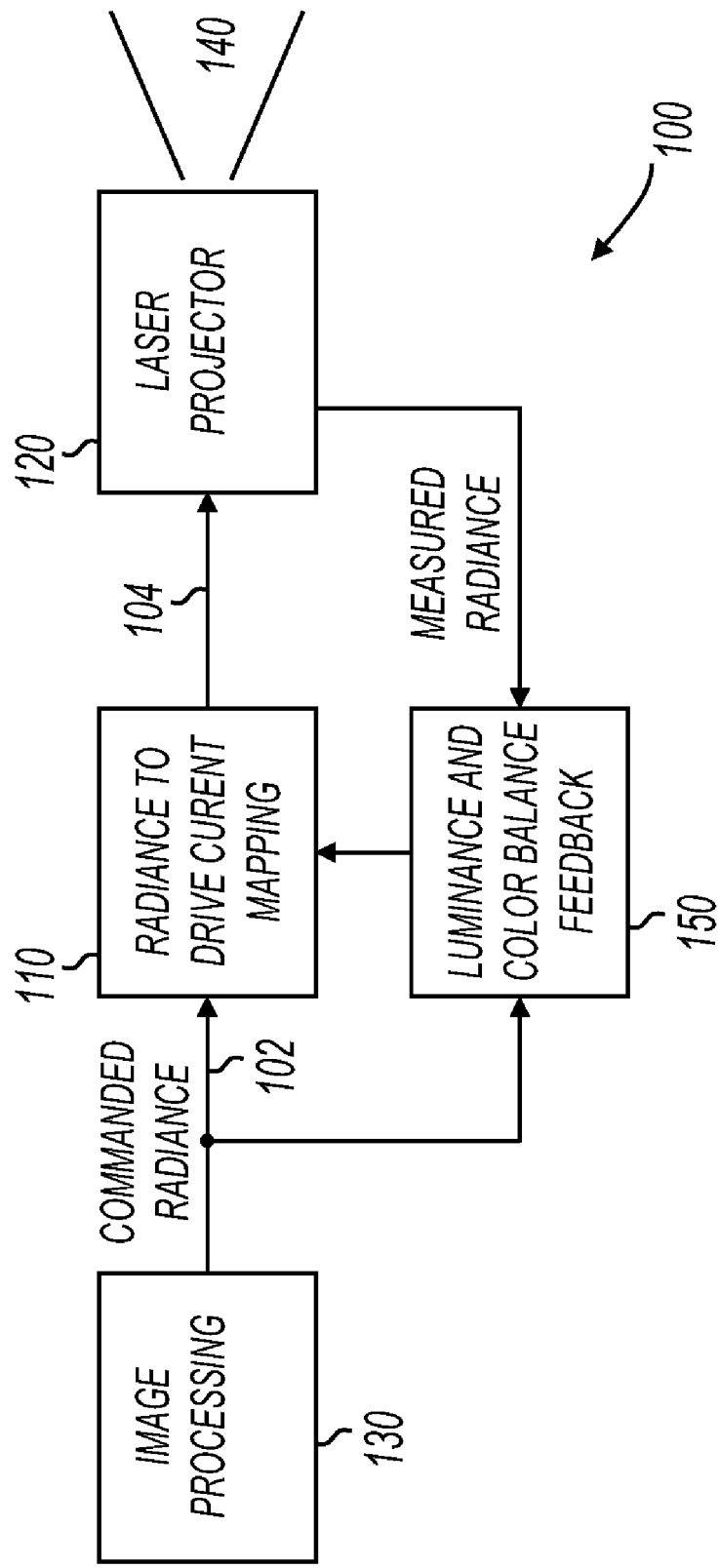
FIG. 1 shows a laser projection apparatus with luminance and white balance tracking.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a laser projection apparatus with luminance and white balance tracking. Apparatus 100 includes image processing circuitry 130, radiance to drive current mapping 110, laser projector 120 and luminance and color balance feedback circuit 150.

In operation, laser projector 120 scans a light beam back and forth horizontally and up and down vertically to "paint" an image. The radiance of the light is changed at discrete points to illuminate pixels on a display surface. Image processing circuitry 130 determines the radiance of one more colors to be displayed at a pixel location in an image. Circuitry 130 presents a "commanded radiance" on node 102 to mapping component 110. Mapping component 110 maps the commanded radiance to a drive current value on node 104. Laser projector 120 receives the drive current value on node 104 and projects light at 140. In some embodiments, laser projector 120 receives a variable current on node 104 and this current is passed through a laser diode. In other embodiments, laser projector 120 receives digital data on node 104 and laser projector 120 includes a digital-to-analog converter (DAC) to produce the current to pass through the laser diodes.

Laser projector 120 may include laser diodes that heat up or cool off based on ambient temperature changes. Further, laser diodes within projector 120 may heat up when emitting light. Further, multiple historical drive currents may have a cumulative heating effect on the laser diodes. As the temperature of a laser diode changes, the radiance for a given drive current also changes. This can result in variations in overall luminance (brightness) of the displayed image. Other factors may also affect laser diode radiance over time. For example, the radiance of laser diodes may change over time due to aging.

Some laser diodes may be more sensitive than others to temperature variations. For example, a green laser diode may be more sensitive to temperature variations than other color diodes, such as red and blue. When one laser diode is more sensitive than others, the color balance of the displayed image may change as a function of temperature.

Luminance and color balance feedback circuit 150 accounts for effects of temperature variations and other factors and modifies the mapping of commanded radiance to drive current values within mapping component 110. In some embodiments, the mapping is modified to correct for luminance variations only. In other embodiments, the mapping is modified to correct for color balance only. In still further embodiments, the mapping is modified to correct for luminance as well as color balance. Various embodiments of luminance and color balance feedback circuits are described further below with reference to later figures.

Luminance and color balance feedback circuit 150 receives the commanded radiance values from image processing circuit 130, and also receives measured radiance values from laser projector 120. Luminance and color balance feedback circuit 150 compares the commanded radiance to the measured radiance and modifies the radiance to drive current mapping to correct for luminance and/or color balance variations.

Figure 2:
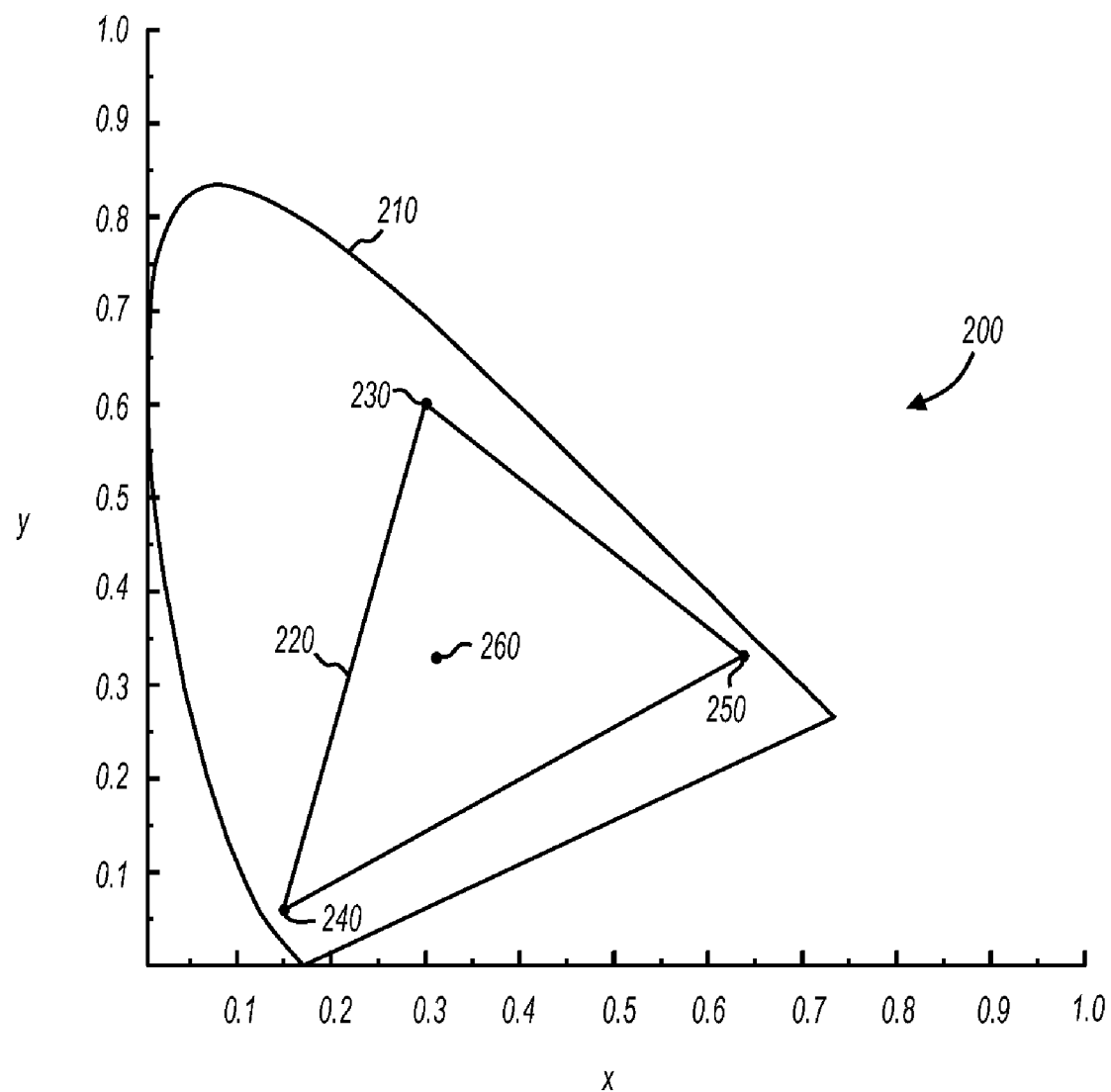
FIG. 2 shows an International Commission on Illumination (CIE) chromaticity diagram.

FIG. 2 shows an International Commission on Illumination (CIE) chromaticity diagram. Chromaticity diagram 200 includes envelope 210 representing all colors observable by the human eye. Within this envelope 210, a triangular region 220 represents a typical chromaticity gamut which encloses all of the colors producible in a standard red/green/blue (sRBG) display device. The region 220 is defined as the area within the three primary color points: red 250, green 230, and blue 240.

As shown in FIG. 2, in CIE xy chromaticity coordinates red is at [0.6400, 0.3300], green is at [0.3000, 0.6000], and blue is at [0.1500, 0.0600]. As with any RGB color space, for non-negative values of R, G, and B it is not possible to represent colors outside the color triangle defined by the primaries, the chromaticity gamut, which is well inside the range of colors visible to a human.

Point 260 represents a "white point." A white point is a set of chromaticity coordinates that serve to define the color "white" in image capture or reproduction. Different definitions of white may be used based on application. White point 260 is shown as the CIE D65 white point at [0.3127, 0.3290]. D65 white is well defined in the literature as are chromaticity diagrams in general. D65 white is referred to as an example white point to illustrate color balancing in the various embodiments of the present invention. The present invention is not limited to D65 white points. Any white point may be utilized without departing from the scope of the present invention.

As laser diodes change radiance in laser projection systems, the white point may move away from a calibrated value. For example, a laser projector calibrated to D65 white may display a white point other than D65 if the color laser diodes have different radiance variations as a function of temperature. If the green laser diode is more sensitive to temperature than the red and blue laser diodes, the displayed white point may move away from green point 230 as temperature increases, and may move toward green point 230 as temperature decreases.

Various embodiments of the present invention measure radiance of one or more laser diodes, and compare the measured radiance to the expected radiance. A radiance to drive current mapping may be updated to compensate for differences between expected and measured radiance values. For example, as shown in FIG. 1, laser projector 120 may provide measured radiance values to luminance and color feedback circuit 150. Feedback circuit 150 also receives expected radiance values from image processing circuitry 130. Radiance to drive current mapping component 110 is then updated by luminance and color balance feedback circuit 150.

In some embodiments, radiance to drive current mappings are updated for all three colors. In other embodiments, radiance to drive current mappings are updated for only one of the three colors. The mappings may be updated to correct for luminance alone, or may be updated to track the white balance. In some embodiments, radiance ratios between the various colors are set to maintain a D65 white point.

Figure 3:
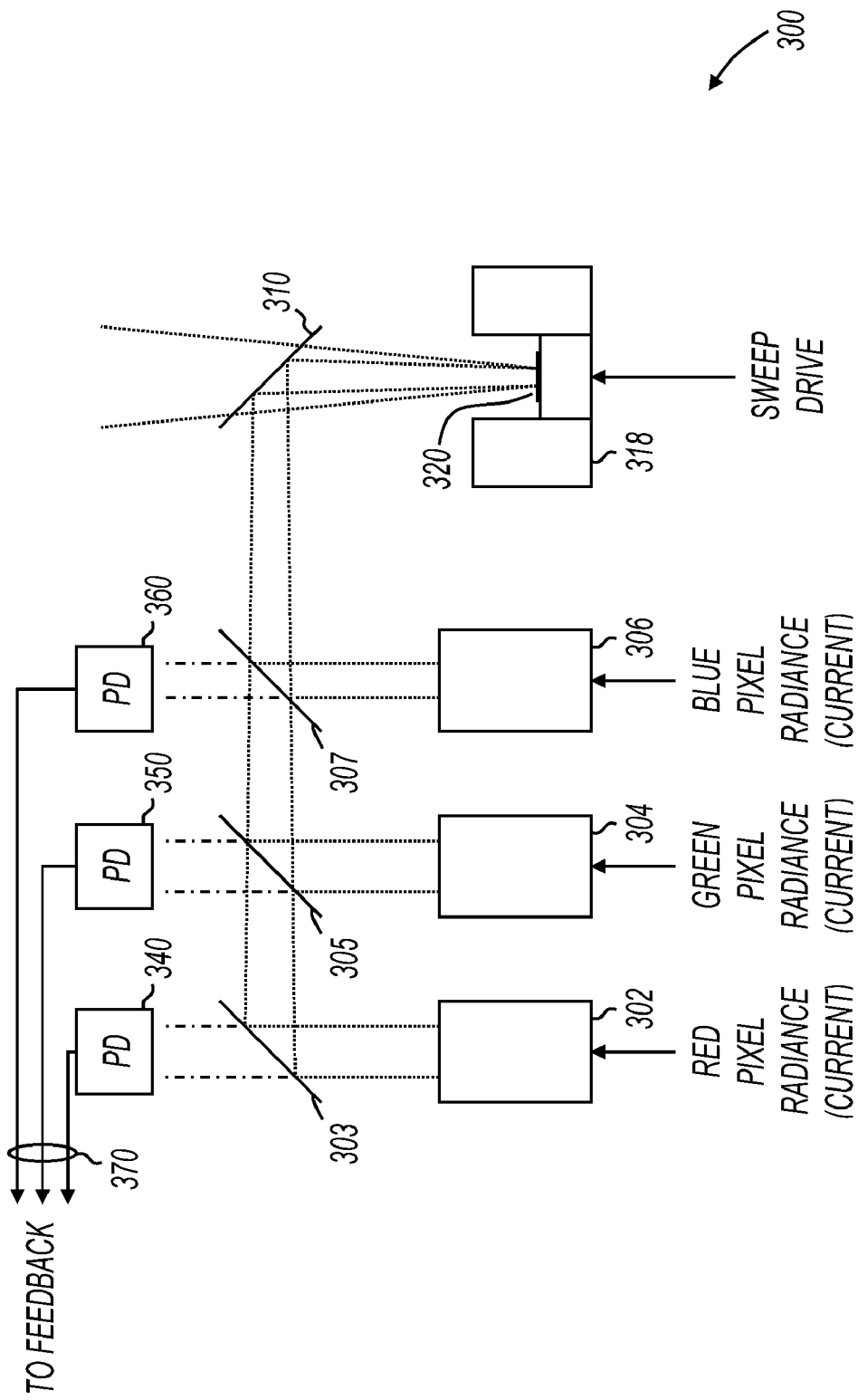
FIGS. 3 and 4 show micro-projectors.

FIG. 3 shows a micro-projector. Projector 300 may be used in apparatus 100 (FIG. 1) as laser projector 120, although this is not a limitation of the present invention.

Projector 300 includes laser diodes 302, 304, and 306. Projector 300 also includes mirrors 303, 305, and 307, filter/polarizer 310, and micro-electronic machine (MEMS) device 318 having mirror 320. The laser diodes are driven by red, green, and blue radiance data (current) as described with reference to FIG. 1. Red, green, and blue light is provided by the laser diodes. Laser diodes typically produce light as a column, and this column emerges as a narrow beam. When each beam is directed at the MEMS mirror (either directly or through guiding optics) the colors of light can be mixed on the surface of the mirror, pixel by pixel.

The MEMS mirror rotates on two axes to sweep the light beams in both horizontal and vertical directions. The trajectory that the beam takes is a function of the signals received from the sweep drive. In some embodiments, the beam may sweep back and forth horizontally in a sinusoidal pattern. Further, in some embodiments, the beam may sweep up and down vertically in a sinusoidal pattern. In general, the beam may be swept in any combination of horizontal and vertical patterns, including linear and non-linear patterns. Pixels may be displayed when the beam is sweeping in one direction or in both directions. For example, in some embodiments, pixels may be displayed as the beam sweeps down in the vertical direction, but not when the beam sweeps back up. Also for example, in some embodiments, pixels may be displayed as the beam sweeps down as well as when the beam sweeps up in the vertical direction.

This process of picture-building can be repeated many times per second, to reproduce moving pictures. Therefore, a MEMS mirror and three colored light sources can function like a traditional CRT monitor or television set, but without the metal and glass vacuum tube, and without the phosphors on a screen. Instead, this produces a small projector, with a nearly infinite focal point.

By using solid-state colored continuous beam laser diodes, it is possible to build such a projection device on the millimeter scale. Further, by modulating the power to each laser diode as needed to produce a particular color, it is possible to greatly reduce the electrical requirements of such a device. Together, this yields a projection device that can fit into a small form factor device, and that can run reliably on its stored battery power. The MEMS based projector is described as an example, and the various embodiments of the invention are not so limited. For example, other projector types may be included in projection systems with luminance and color balancing without departing from the scope of the present invention.

Projector 300 also includes photodetectors (PD) 340, 350, and 360. Photodetectors 340, 350, and 360 are aligned such that each one detects light of a different color passing through one of mirrors 303, 305, and 307. Mirrors 303, 305, and 307 allow a predetermined amount of light to pass through to the photodetectors while reflecting the remaining light to mirror 310. The photodetectors supply measured radiance values to a feedback circuit at 370.

Although photodetectors are shown detecting light on the back sides of mirrors 303, 305, and 307, this is not a limitation of the present invention. In various embodiments of the present invention, photodetectors are placed in various locations to detect the different colors of light.

Figure 4:
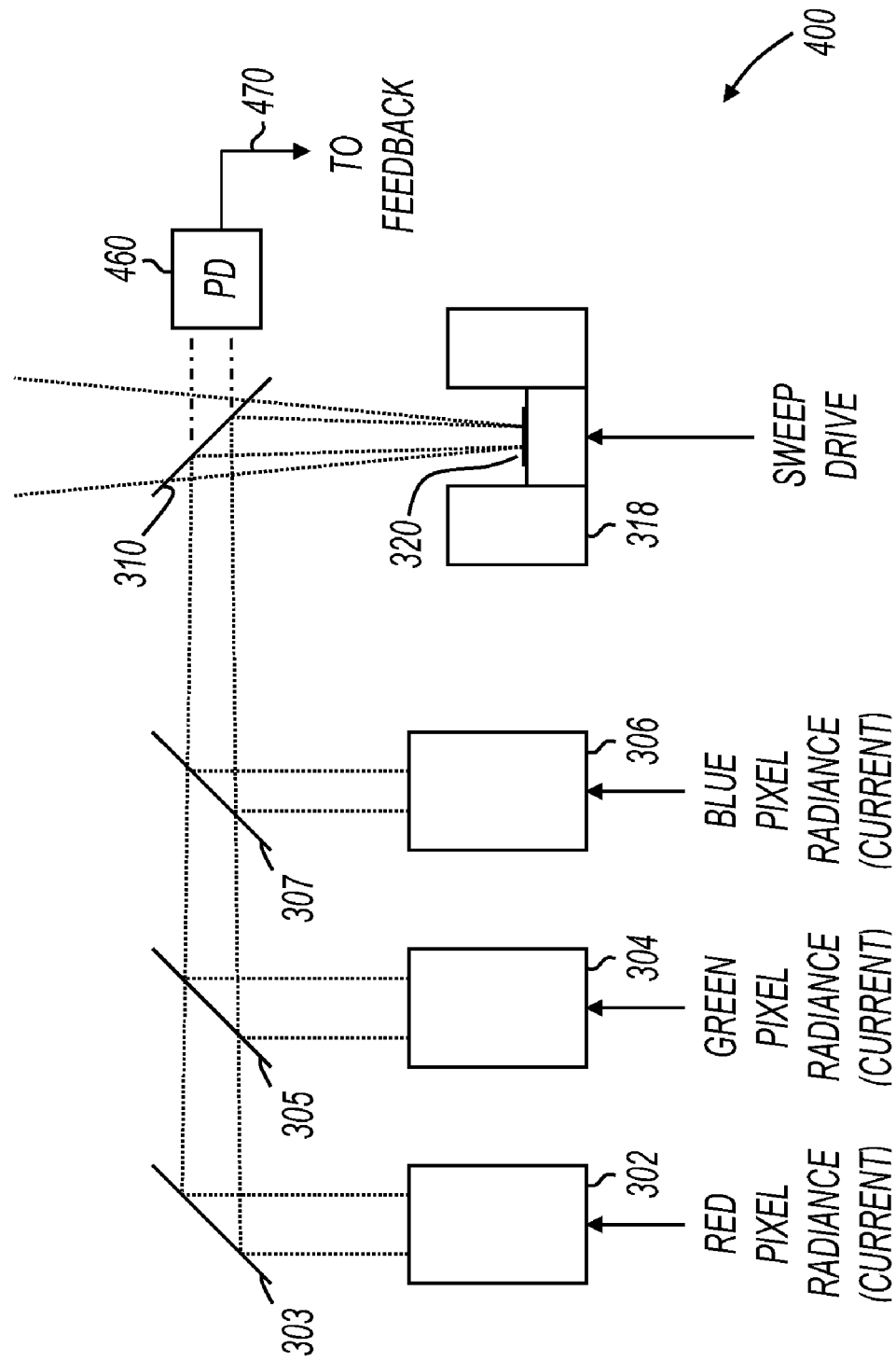

FIG. 4 shows a micro-projector. Projector 400 may be used in apparatus 100 (FIG. 1) as laser projector 120, although this is not a limitation of the present invention.

Projector 400 includes laser diodes 302, 304, and 306, mirrors 303, 305, and 307, filter/polarizer 310, and micro-electronic machine (MEMS) device 318 having mirror 320, all of which are described above with reference to FIG. 3. Projector 400 also includes integrated photodetector 460 situated on the back side of filter/polarizer 310. Photodetector 460 detects light for all three colors and provides measured radiance data for all three laser diodes at 470.

Although integrated photodetector 460 is shown situated on the backside of filter/polarizer 310, this is not a limitation of the present invention. For example, photodetector 460 may be situated anywhere suitable to measure the radiance of multiple laser diodes.

Figure 5:
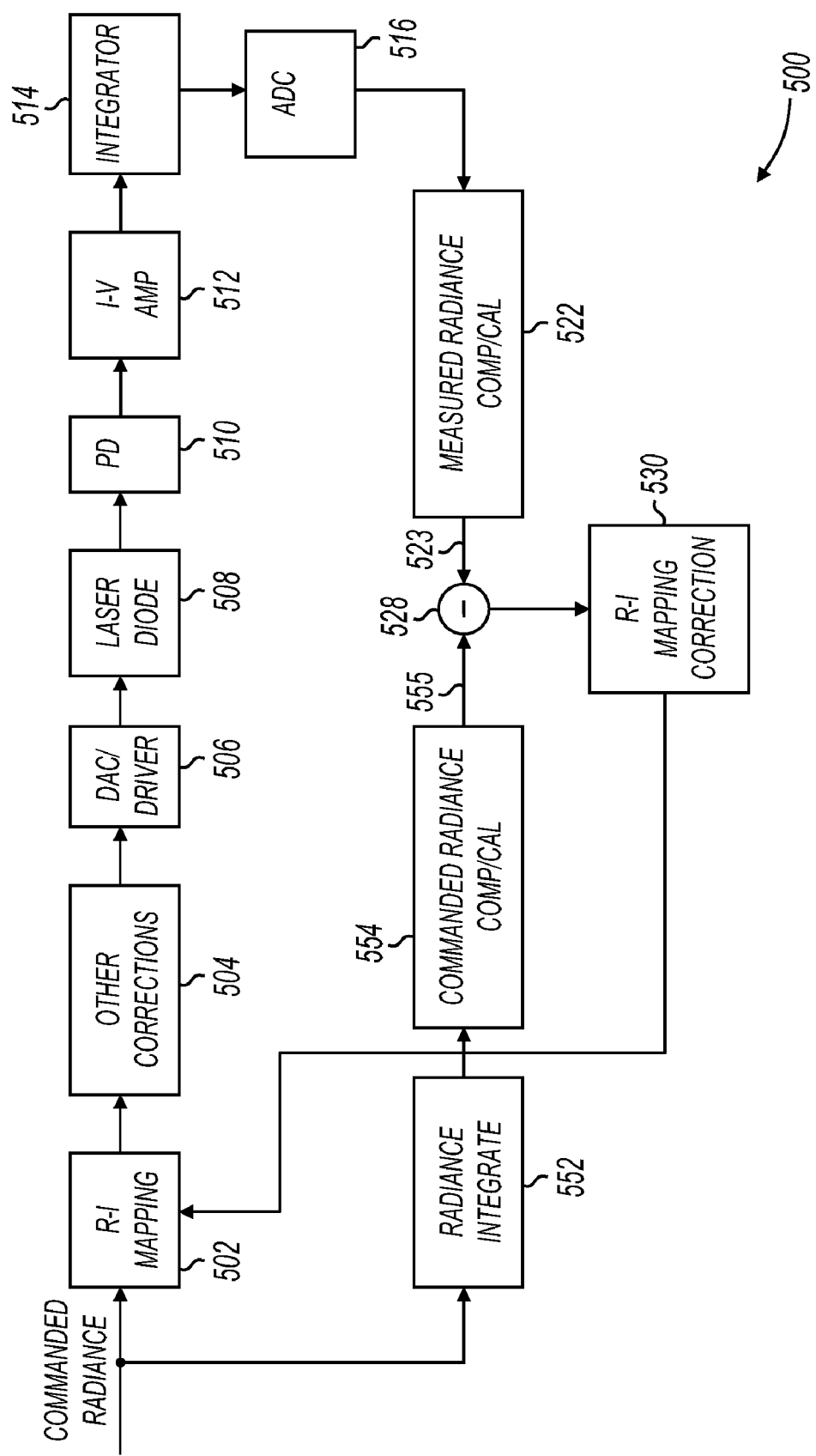
FIGS. 5 and 6 show laser projectors with luminance and white balance tracking.

FIG. 5 shows a laser projection device with luminance tracking. Laser projection device 500 includes radiance-to-current (R-I) mapping component 502, other correction circuits 504, digital-to-analog converter (DAC) and driver 506, laser diode 508, photodetector (PD) 510, transimpedance amplifier 512, integrator 514, analog-to-digital converter (ADC) 516, measured radiance compensation and calibration circuits 522, radiance integration circuit 552, commanded radiance compensation and calibration circuits 554, subtractor 528, and R-I mapping correction component 530.

In operation, a commanded radiance value is provided to R-I mapping component 502, which provides a drive current value to circuits 504 and DAC/driver 506. DAC/driver 506 produces an analog drive current that is driven through laser diode 508. R-I mapping component 502 is a modifiable device capable of storing mappings from commanded radiance values to laser diode current values. For example, R-I mapping component 502 may be a random access memory device holding a look-up table. In some embodiments, the look-up table may be implemented in a dual port memory that can be modified from one port and "looked up" from another port. In other embodiments, R-I mapping component may be a mathematical function to map radiance values to drive current values. R-I mapping component may be implemented in any manner without departing from the scope of the present invention.

Correction circuits 504 may include any compensation or transform suitable for the displayed image. For example, compensation circuits 504 may include color correction such as gamma correction. Any type of compensation or correction may be performed on the digital driver current value without departing from the scope of the present invention.

DAC/driver 506 includes a digital-to-analog converter as well as driver circuitry to drive the laser diode. The DAC may accept any number of digital input bits and may have any resolution. For example, in some embodiments, the DAC may accept eight, ten, or more input bits. The driver circuit may include analog circuits such as amplifiers and drivers suitable to drive laser diodes.

Laser diode 508 produces light in response to the drive current. Laser diode 508 may be any laser diode useful in a projection device. For example, laser diode 508 may be one of diodes 302, 304, or 306 (FIGS. 3, 4).

Photodetector 510 measures the radiance of laser diode 508. PD 510 may be any photodetector, including any of those shown in FIG. 3. Photodetectors typically output a current that is a function of the measured light. Transimpedance amplifier 512 converts the current provided by PD 510 into a voltage. The voltage output from transimpedance amplifier 512 is integrated by integrator 514 to provide an average of the transimpedance amplifier output over an integration period. The integration period may be any length. In some embodiments, the integration period is long enough to increase the signal-to-noise ratio (SNR) of the transimpedance amplifier output, but is short enough to allow fast luminance correction. In some embodiments, integrator 514 is incorporated into the photodetector by virtue of the natural response time of the photodetector. For example, the laser diode may emit pulsed light on a pixel by pixel basis, and the photodetector output may reflect the average amount of light incident on the photodetector over a number of pixels.

ADC 516 converts the output of integrator 514 (or transimpedance amplifier 512) to a digital value and provides that digital value to measured radiance comp/cal circuits 522.

Circuits 522 apply compensation and calibration transformations to the received values to remove the effects of circuits placed after laser diode 508. For example, the photodetector and transimpedance amplifier may have transfer functions that are compensated for by comp/cal circuits 522. The output of comp/cal circuits 522 attempts to faithfully represent the actual radiance of the laser diode at 523.

The commanded radiance is provided to radiance integrate circuit 552 which integrates over the same period as integrator 514. In some embodiments, integrator 514 is omitted, and integrate circuit 552 integrates over a period to match the natural response of circuits in the measurement path, such as PD 510.

Commanded radiance compensation and calibration circuits 554 apply compensation and calibration transformations to the received values to remove the effects of circuits placed before laser diode 508. For example, the DAC and driver amplifier may have transfer functions that are compensated for by comp/cal circuits 554. Comp/cal circuits 554 attempt to represent at 555 the expected radiance actually produced by the laser diode.

Subtractor 528 compares the commanded and measured radiances and produces an error value. The error value is provided to R-I mapping correction component 530, which then conditionally modifies the contents of R-I mapping component 502. R-I mapping component 502 may be modified by updating a look-up table or by updating mathematical functions implemented within component 502. By matching the commanded and measured radiance values 555 and 523, laser diode luminance variations are reduced. For example, luminance variations caused by temperature changes can be reduced.

The feedback loop shown in FIG. 5 may be continuously operated at various output light levels. For example, when the commanded radiance corresponds to pixels in a displayed image (video or still), the output light levels over the integration period may vary in different portions of the image. In some embodiments, R-I mapping correction component 530 collects correction data at various light levels and corrects offset and gain of a transfer function held in R-I mapping component 502. In some embodiments, the transfer function is modified based on two data points. For example, one data point at a low light level, and one data point at a higher light level may be used to determine an offset and gain for the data in the R-I mapping component. In other embodiments, R-I mapping correction component 530 may collect data at many light levels and map out a completely new transfer function for R-I mapping component 502.

The various components shown in FIG. 5 may be implemented in many different ways without departing from the scope of the present invention. For example, some components may be implemented in hardware or software or a combination of hardware/software. As specific examples, and not by way of limitation, comp/cal circuits 522 and 554, and/or R-I mapping correction component 530 may be implemented in dedicated hardware circuits or parameterized hardware circuits. Further, comp/cal circuits 522 and 554, and/or R-I mapping correction component 530 may be implemented by a processor executing software instructions.

Figure 6:
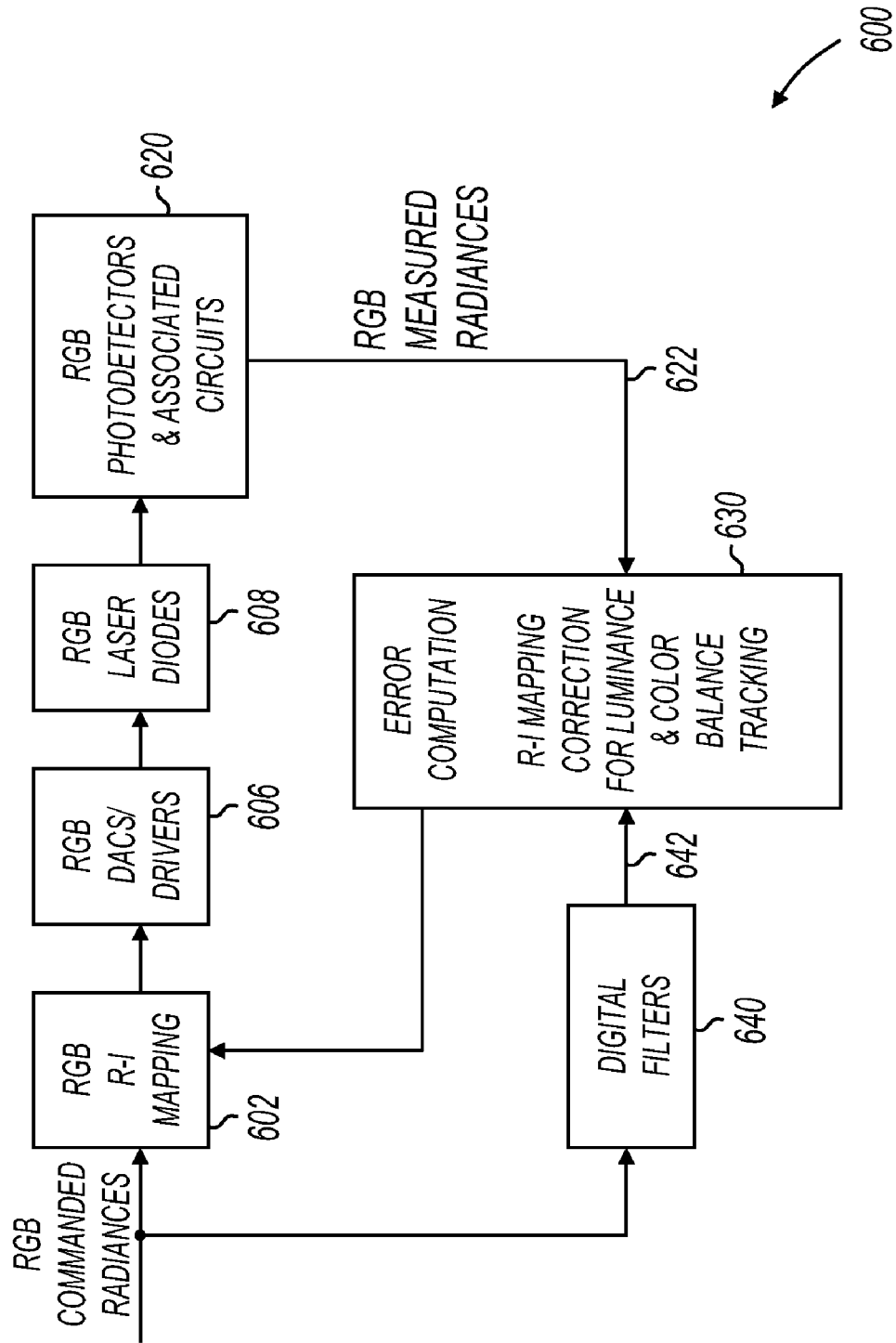

FIG. 6 shows a laser projection device with luminance and color tracking. Laser projection device 600 includes red/green/blue (RGB) radiance-to-current (R-I) mapping components 602, RGB DAC/drivers 606, RGB laser diodes 608, RGB photodetectors and associated circuits 620, digital filters 640, and luminance and color tracking correction component 630. Laser projection device 600 may also include other circuits such as the comp/cal circuits shown in FIG. 5. These circuits are intentionally omitted from FIG. 6 for simplicity.

RGB R-I mapping components 602 receive commanded radiances for red, green, and blue laser diodes. In some embodiments, the R-I mapping components 602 are look-up tables that are maintained in separate memory devices, and in other embodiments, R-I mapping components 602 are look-up tables share a single memory device. In still further embodiments, R-I mapping components 602 are implemented as mathematical functions. The R-I mapping components independently map red, green, and blue commanded radiance values to laser diode drive current values.

RGB DAC/drivers 606 convert the RGB laser drive current values to drive currents, and RGB laser diodes 608 are driven with those currents to produce a composite color pixel. For example, RGB laser diodes 608 may correspond to laser diodes 302, 304, and 306 (FIGS. 3, 4).

RGB photodetectors and associated circuits 620 detect the amount of light emitted from laser diodes 608. For example, the RGB photodetectors may be photodetectors 340, 350, and 360 (FIG. 3) or photodetector 460 (FIG. 4). The associated circuits may include integrators, ADCs, calibration circuits, as well as other suitable circuitry to condition and produce the RGB measured radiances at 622.

The RGB commanded radiances are also provided to digital filters 640. Digital filters 640 filter the commanded radiance values prior to comparison with the measured radiance values at 622. In some embodiments, digital filters 640 attempt to compensate for the response of all circuits in the loop. For example, in some embodiments, digital filters 640 compensate for the response of the drivers in RGB DAC/drivers 606 as well as the response of the RBG photodetectors.

Luminance and color balance tracking correction component 630 computes the error between radiance values for each color provided at 622 and 642. In some embodiments, the error information is used to modify the R-I mapping component for one or more colors to correct for luminance variations. For example, if the measured radiance of all three laser diodes is below the expected radiance, then each of the R-I mapping components may be modified to increase the laser diode drive currents. Also for example, if the measured radiance of one laser diode is below the expected radiance, then the R-I mapping component corresponding to that laser diode may be modified to increase the laser diode drive current.

In some embodiments, the error information is used to modify the R-I mapping components for one or more colors for color balance tracking. For example, the R-I mapping components may be modified to maintain radiance ratios between the colors to maintain a white point as described above with reference to FIG. 2. In some embodiments, the R-I mapping component for one color is modified to correct for luminance variation, and the remaining two R-I mapping components are modified to correct for color balance variations. For example, in some embodiments, the green laser diode may be significantly more sensitive to temperature variations. In these embodiments, a look-up table corresponding to the green laser diode may be modified to correct for luminance variations, and look-up tables for the red and blue laser diodes may be modified to maintain the proper ratios for color balance.

The various components shown in FIG. 6 may be implemented in hardware, software, or any combination thereof. For example, digital filters 640 and/or luminance and color balance tracking component 630 may be implemented in dedicated hardware circuits, parameterizable hardware circuits, or in software running on a processor.

Figure 7:
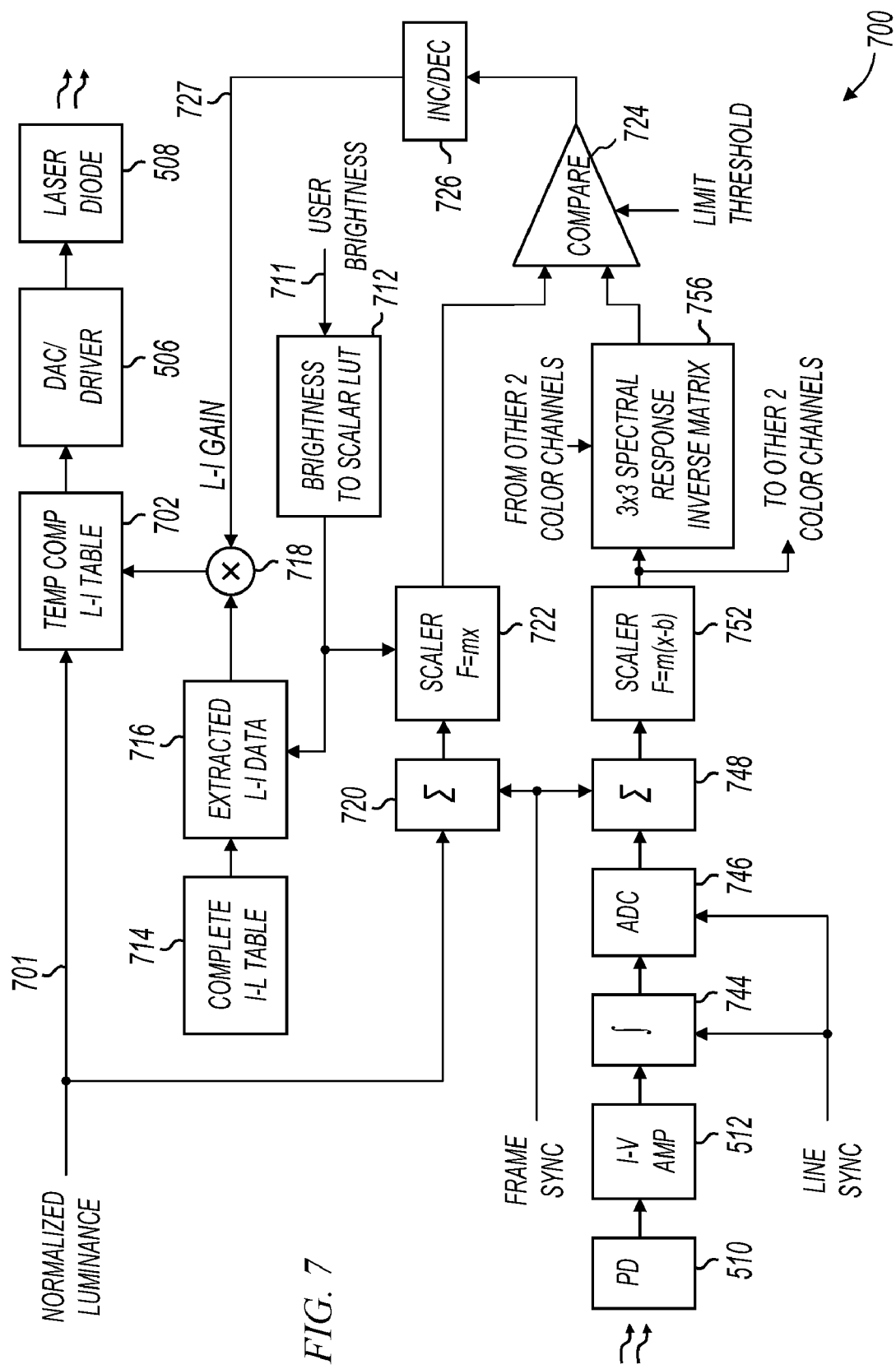
FIG. 7 shows a temperature compensated laser projector color channel.

FIG. 7 shows a temperature compensated laser projector color channel. Laser projector color channel 700 is a circuit that includes a laser diode, a photodetector, and other associated circuitry to compensate for changes in laser diode characteristics that result from temperature changes and aging. The circuit of FIG. 7 compensates one color channel. For example, the circuit of FIG. 7 may compensate for changes in a red laser diode, a green laser diode, or a blue laser diode.

In some embodiments, a color projector includes three color channels 700, one for each of red, green, and blue. In these embodiments, each color channel is separately compensated for luminance variations, and white balance is maintained as a result. Although each color channel is separately compensated for luminance variations, color channel 700 may include circuitry to reduce effects of crosstalk between color channels. See the 3×3 spectral response inverse matrix 756. This is described further below.

In operation, circuit 700 receives a normalized luminance value at 701. The normalized luminance values are represented as values between zero and one, with one being the brightest and zero being dark. The normalized luminance may be provided by an image processing apparatus. For example, the normalized luminance values may be provided by a video processing apparatus.

Whereas the circuit of FIG. 7 is shown receiving normalized luminance, previous diagrams show circuits that receive a commanded radiance. Radiance is measured in units of radiant flux (e.g., Watts), and typically has normalized luminance values factored in. For example, a commanded radiance value may be a function of normalized luminance as well as a user brightness value. The circuit of FIG. 7 shows luminance and user brightness separately, although this is not a limitation of the present invention.

Temp compensated L-I table 702 receives the normalized luminance (L) value, and maps it to a current (I) value. The current value is provided to digital-to-analog converter (DAC) 506 which drives laser diode 508. Table 702 is a lookup table that compensates for the nonlinearity in the laser diode 508 by including a reciprocal transfer function. When combined, the laser diode and lookup table transfer functions provide an end-to-end linear response between the normalized luminance and the actual photonic output of the laser diode.

The contents of table 702 may be updated periodically to compensate for changes in temperature or age in the laser diode, or to factor in a change in user brightness level. For example, in some embodiments, the table is updated once each video frame. In other embodiments, the table is updated when a user changes a desired brightness level. In still further embodiments, the table is updated whenever necessary to compensate for measured variations.

The contents of table 702 are determined by multiplying a L-I gain value on node 727 with L-I data 716 that is extracted from a complete I-L table 714. The complete I-L table 714 includes data representing a fixed current (I) to luminance (L) curve that spans a large range of luminance and current and represents the complete laser diode operating curve for a given set of operating conditions (e.g., age, temp).

In some embodiments, a portion of the complete diode operating curve is extracted for use based on the application or user preference. For example, based on preference, a user may set the brightness control such that only the lower 50% of the I-L curve is used. Also for example, when used in a head-up display application, the brightness control may be set much higher to overcome ambient light conditions.

In some embodiments, the diode characteristics may be measured and the I-L table 714 may be loaded during manufacture, and the contents of I-L table 714 may be static thereafter. In other embodiments, the characteristics of the laser diode may be periodically measured, and I-L table 714 may be periodically updated. For example, in some embodiments, the characteristics of the laser diode may be measured at power-on, and the I-L table 714 may be static until power is cycled.

The user brightness level is set at 711, and the user brightness level is mapped to a scalar value by look-up table (LUT) 712. The brightness scalar is provided to scaler 722 (described further below) and is used in the extraction of L-I data 716. The extracted portion of the L-I data is multiplied by L-I gain and then loaded into table 702, so that the extracted portion of the diode curve will be fully utilized over the normalized luminance range.

In some embodiments, the user brightness to scalar LUT 712 may not be linear. For example, the mapping may be calibrated based on a human's perception of brightness.

The L-I gain value on node 727 is influenced by a comparison between an expected radiance level and a measured radiance level. Circuit 700 includes a radiance prediction apparatus to determine expected radiance levels based on the normalized luminance and user brightness levels. The radiance prediction apparatus includes accumulator 720 and scaler 722. Accumulator 720 accumulates the normalized luminance values over an accumulation period. Accumulator 720 receives a reset signal, shown in FIG. 7 as a frame sync. The period of the reset signal determines the accumulation period over which accumulator 720 operates. In embodiments represented by FIG. 7, the reset signal is provided by the frame sync, and the integration period corresponds to a video frame.

Scaler 722 scales the accumulated luminance to account for the user brightness. Scaler 722 also scales the accumulated luminance to be in units of radiant flux (e.g., Watts) so that it can be compared with measured radiance levels.

Circuit 700 includes a radiance measurement apparatus to measure radiance. The radiance measurement apparatus includes photodetector 510, transimpedance amplifier 512, integrator 744, analog-to-digital converter (ADC) 746, accumulator 748, scaler 752, and 3×3 spectral response inverse matrix 756.

Photodiode 510 detects light emitted from laser diode 508, and supplies a proportional current to transimpedance amplifier 512. Voltage output from transimpedance amplifier 512 is integrated in the analog domain over each video line. ADC 746 converts the integrated voltage to a digital value. Digital values representing the integrated lines are accumulated by accumulator 748. Accordingly, the output of accumulator 748 is proportional to the amount of light detected by photodetector 510 over the video frame.

Although the integration/accumulation period for both the radiance prediction apparatus and radiance measurement apparatus is shown as one video frame, this is not a limitation of the present invention. For example, the integration/accumulation period may be equal to a video line. Also for example, the integration/accumulation period may be more or less than one video line, or more or less than one video frame.

Scaler 752 receives the output of accumulator 748, and provides offset and gain adjustment. The offset "b" subtracts out any offsets introduced by other circuit elements. For example, the offset can remove the effects of "dark current", which is the current supplied by photodetector 510 when no light is present. The dark current can be calibrated by measuring the photodetector output over one line when there is no light. The multiplier "m" allows scaling to convert to units of radiant flux, which are the same units output by scaler 722.

Some embodiments include three circuits 700, one for each of red, green, and blue laser diodes. In these embodiments, each photodetector may pick up some unwanted light from other laser diodes. For example, a photodetector meant to measure light from the green laser diode may pick up some light from the red and blue laser diodes. This "crosstalk" may cause a measurement error that without correction may propagate into an error in the L-C tables.

The 3×3 spectral response inverse matrix 756 "combs out" the red, green and blue to remove any error caused by crosstalk. 3×3 spectral response inverse matrix 756 receives the measured and scaled radiant flux values from each of the three color circuits, and performs a 3×3 matrix multiply. The crosstalk contributions may be measured during manufacture or test, and the contents of the 3×3 matrix are set at that time. In some embodiments, crosstalk contributions may be periodically measured during the life of the color laser projector.

Although the 3×3 spectral response inverse matrix is shown between scaler 752 and comparator 724, this is not a limitation of the present invention. For example, some embodiments of the present invention include a spectral response matrix in the path between scaler 722 and comparator 724. These embodiments convert the normalized luminance input to the color crosstalk polluted values expected in the feedback channel, whereas the matrix 756 as shown in FIG. 7 converts the feedback input to pure color radiant flux values.

Comparator 724 compares the expected and measured radiant flux values provided by the radiance prediction apparatus and radiance measurement apparatus. If they differ by at least a threshold (limit threshold), then the output of comparator 724 causes incrementer/decrementer (INC/DEC) 726 to modify the L-I gain value on node 727. The L-I gain value is modified after each integration/accumulation period when the expected and measured radiance values differ by the limit threshold. In embodiments represented by FIG. 7, the L-I gain value is incremented or decremented each time the expected and measured radiance values differ by the limit threshold. In other embodiments, a proportional controller may be used to modify the L-I gain value in response to the comparator. A proportional controller may adjust the gain value by a value proportional to the output of the comparator, rather than incrementing or decrementing.

The various components shown in FIG. 7 can be implemented in many different ways. For example, various components may be implemented in digital hardware, analog hardware, software, or any combination. Further, the various embodiments of the present invention may be implemented with any level of integration. For example, many of the components may be included in application specific integrated circuits.

Figure 8:
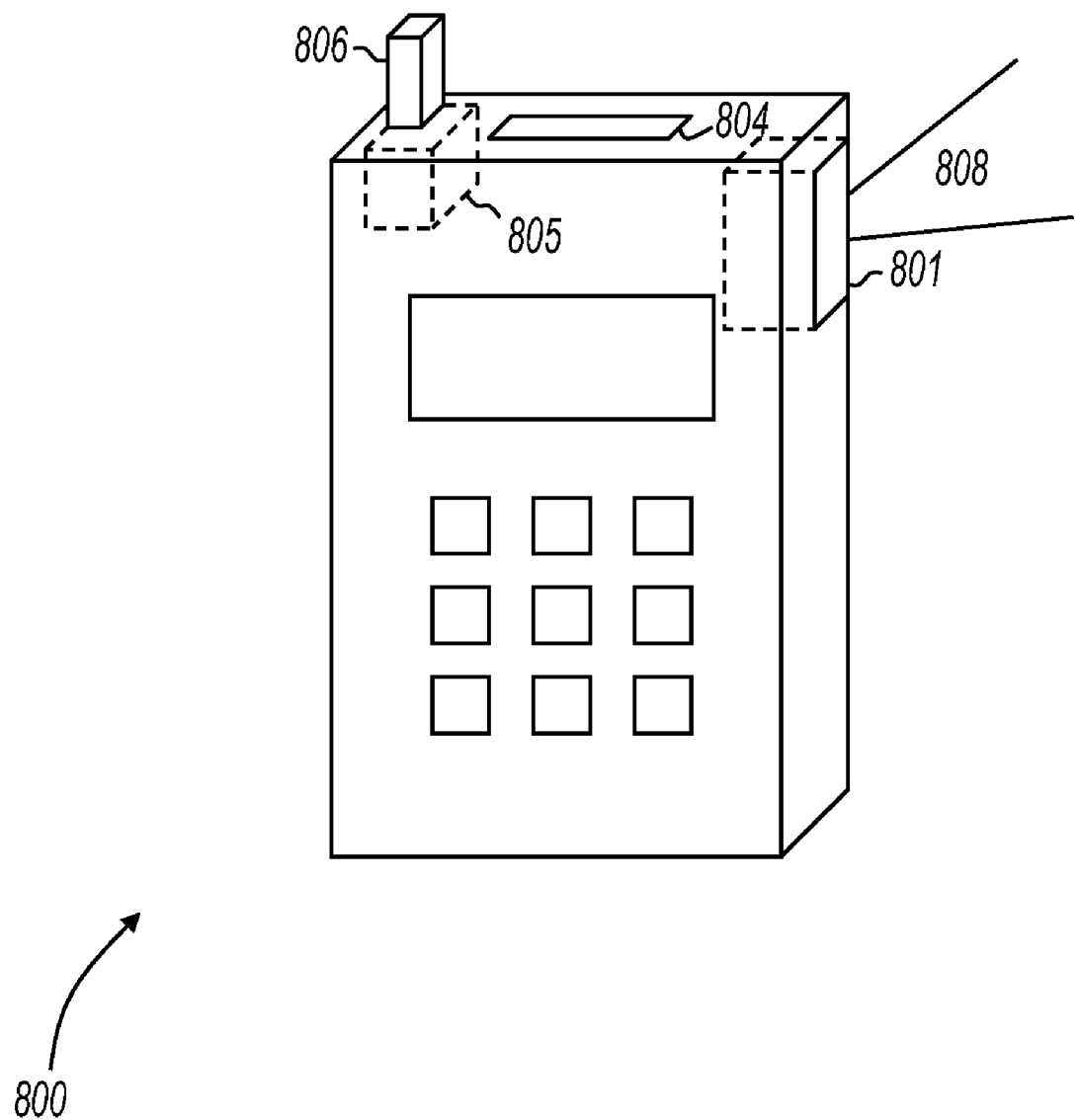
FIG. 8 shows a mobile device in accordance with various embodiments of the present invention.

FIG. 8 shows a mobile device in accordance with various embodiments of the present invention. Mobile device 800 may be a hand held projection device with or without communications ability. For example, in some embodiments, mobile device 800 may be a handheld projector with little or no other capabilities. Also for example, in some embodiments, mobile device 800 may be a portable music player. Also for example, in some embodiments, mobile device 800 may be a device usable for communications, including for example, a cellular phone, a smart phone, a personal digital assistant (PDA), a global positioning system (GPS) receiver, or the like. Further, mobile device 800 may be connected to a larger network via a wireless (for example, WiMax) or cellular connection, or this device can accept data messages or video content via an unregulated spectrum (for example, WiFi) connection.

Mobile device 800 includes laser projector 801 to create an image with light 808. Similar to other embodiments of projection systems described above, mobile device 800 may include feedback loops useful for luminance and color balance tracking to compensate for temperature variations in laser diodes.

In some embodiments, mobile device 800 includes antenna 806 and electronic component 805. In some embodiments, electronic component 805 includes a receiver, and in other embodiments, electronic component 805 includes a transceiver. For example, in GPS embodiments, electronic component 805 may be a GPS receiver. In these embodiments, the image displayed by laser projector 801 may be related to the position of the mobile device. Also for example, electronic component 805 may be a transceiver suitable for two-way communications. In these embodiments, mobile device 800 may be a cellular telephone, a two-way radio, a network interface card (NIC), or the like.

Mobile device 800 also includes memory card slot 804. In some embodiments, a memory card inserted in memory card slot 804 may provide a source for video data to be displayed by laser projector 801. Memory card slot 804 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Figure 9:
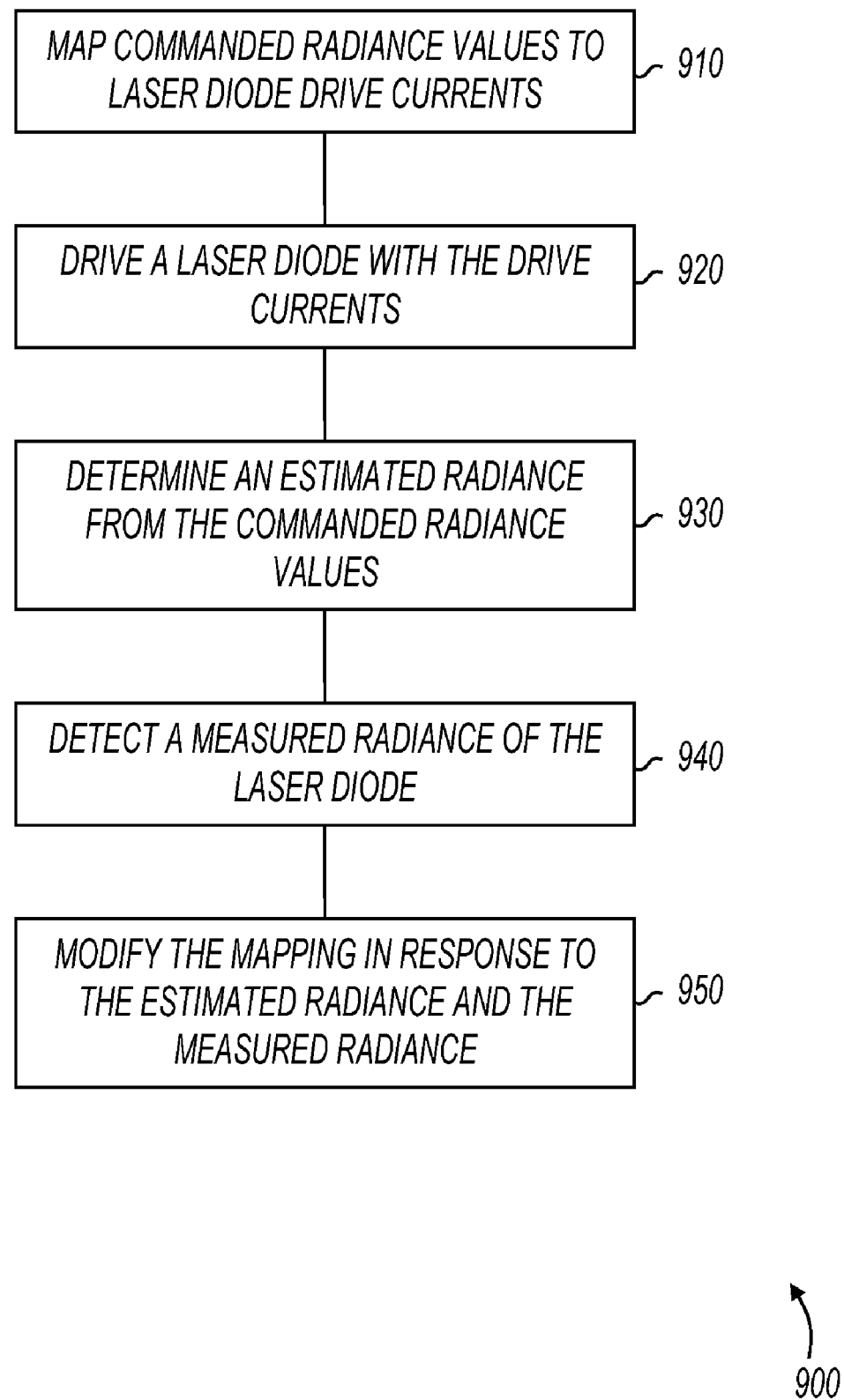
FIG. 9 shows a flowchart in accordance with various embodiments of the present invention.

FIG. 9 shows a flowchart in accordance with various embodiments of the present invention. In some embodiments, method 900, or portions thereof, is performed by a laser projector, a mobile device, or the like, embodiments of which are shown in previous figures. In other embodiments, method 900 is performed by an integrated circuit or an electronic system. Method 900 is not limited by the particular type of apparatus performing the method. The various actions in method 900 may be performed in the order presented, or may be performed in a different order. Further, in some embodiments, some actions listed in FIG. 9 are omitted from method 900.

Method 900 is shown beginning with block 910 in which commanded radiance values are mapped to laser diode drive currents. In some embodiments, commanded radiance values are produced by image processing or video processing components within a projection device. Commanded radiance values may include different radiance values for different color laser diodes to display one pixel in an image. Commanded radiance values may also include different radiance values for each laser diode for a number of pixels.

Commanded radiance values may be mapped to drive current values using any suitable means. For example, R-I mapping components 502 (FIG. 5) or 602 (FIG. 6) may be used to map commanded radiance values to digital laser diode current values. The digital laser diode current values may then be converted to drive currents using a digital-to-analog converter (DAC).

At 920, the laser diode is driven with the drive currents. In some embodiments, this corresponds to one laser diode being driven with multiple currents over time corresponding to multiple pixels. In other embodiments, this corresponds to multiple laser diodes being driven with currents to display one color pixel. In still further embodiments, this corresponds to multiple laser diodes being driven with multiple currents over time display multiple color pixels.

At 930, an estimated radiance is determined from the commanded radiance values. In some embodiments, this includes filtering commanded radiance values to compensate for the effects of amplifiers, DACs, and other components in the projection device. Filtering commanded radiance values may also include integrating commanded radiance values over time to match the response of devices that measure radiance of the laser diodes.

At 940, a measured radiance of the laser diode is detected. Measured radiance values are produced by photodetectors such as those shown in FIGS. 3-6. At 950, the mapping used in 910 is modified in response to the estimated radiance and the measured radiance. In some embodiments, a mapping for one laser diode is modified to correct for luminance variations. In other embodiments, mappings for multiple laser diodes are modified to correct for luminance variations. In still further embodiments, mappings for multiple laser diodes are modified to maintain radiance ratios to correct for color balance variations.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A projector comprising:
   a mapping component to receive normalized luminance values and convert the normalized luminance values to drive current values for each pixel in an image;
   a digital to analog converter to convert the drive current values to drive currents;
   a laser diode to emit a light beam to display each pixel in response to the drive currents;
   a micro-electronic machine (MEMS) device with a mirror that rotates on two axes to reflect and sweep the light beam and display pixels line-by-line;
   a photodetector to detect measured radiance of the laser diode;
   an integrator to integrate the measured radiance over at least one line of pixels; and
   a feedback circuit to modify the mapping component in response to the integrator.

2. The projector of claim 1 further comprising a radiance prediction apparatus to predict the integrated measured radiance over the at least one line of pixels.

3. The projector of claim 2 wherein the feedback circuit comprises a comparator to compare output values from the integrator and the radiance prediction apparatus.

4. The projector of claim 3 wherein the mapping component comprises a look-up table operable to be reloaded in response to the comparator.

5. The projector of claim 2 further comprising an accumulator coupled to accumulate the integrated measured radiance over a frame.

6. The projector of claim 5 wherein the feedback circuit comprises a comparator to compare output values from the accumulator and the radiance prediction apparatus.

7. The projector of claim 6 wherein the mapping component comprises a look-up table operable to be reloaded in response to the comparator.

8. A projector comprising:
   three mapping components to convert normalized luminance values to drive current values for three different colors;

three digital to analog converters to convert the drive current values to drive currents;

three laser diodes to emit different color light beams in response to the drive currents;

a micro-electronic machine (MEMS) device with a mirror that rotates on two axes to reflect and sweep the different color light beams and display pixels line-by-line;

three photodetectors to detect measured radiance of the three laser diodes;

three integrators to integrate the measured radiance over one line of pixels; and a feedback circuit to modify the three mapping components in response to the three integrators.

9. The scanning laser projector of claim 8 wherein the feedback circuit comprises at least one digital accumulator coupled to the three integrators to accumulate integrated values over a plurality of lines of pixels.

10. The scanning laser projector of claim 8 wherein the feedback circuit comprises at least one digital accumulator coupled to the three integrators to accumulate integrated values over a frame of pixels.

11. The scanning laser projector of claim 10 further comprising three radiance prediction apparatus to predict accumulated radiance values for each color for a frame.

12. The scanning laser projector of claim 11 wherein the feedback circuit further comprises at least one comparator to compare an output of the at least one digital accumulator to outputs of the three radiance prediction apparatus to modify a gain value for each color.

13. The scanning laser projector of claim 12 wherein the feedback circuit further comprises at least one multiplier to apply the gain value for each color when modifying the three mapping components.

14. The scanning laser projector of claim 8 wherein the feedback circuit includes a 3×3 spectral response inverse matrix to remove effects of crosstalk between color channels.

15. A projector that includes three color channels, each of the three color channel comprising:

a mapping component to receive normalized luminance values and convert the normalized luminance values to drive current values for each pixel in an image;

a digital to analog converter to convert the drive current values to drive currents;

a laser diode to emit a light beam to display each pixel in response to the drive currents;

a photodetector to detect measured radiance of the laser diode;

an integrator to integrate the measured radiance over at least one line of pixels;

a 3×3 spectral response inverse matrix to remove effects of crosstalk between color channels; and a feedback circuit to modify the mapping component in response to the integrator.

16. The projector of claim 15 further comprising a radiance prediction apparatus to predict the integrated measured radiance over the at least one line of pixels.

17. The projector of claim 16 wherein the feedback circuit comprises a comparator to compare output values from the integrator and the radiance prediction apparatus.

18. The projector of claim 17 wherein the mapping component comprises a look-up table operable to be reloaded in response to the comparator.

19. The projector of claim 16 further comprising an accumulator coupled to accumulate the integrated measured radiance over a frame.

20. The projector of claim 19 wherein the feedback circuit comprises a comparator to compare output values from the accumulator and the radiance prediction apparatus.

* * * * *